United States Patent [19]
Harbig et al.

[11] Patent Number: 5,992,922
[45] Date of Patent: Nov. 30, 1999

[54] SIDE IMPACT PROTECTION MEMBER FOR MOTOR VEHICLE DOORS

[75] Inventors: Peter Harbig, Werther; Michael Schmitt, Bielefeld; Detlef Steinhöfer, Holte-Stuckenbrock, all of Germany

[73] Assignee: Thyssen Industrie AG, Germany

[21] Appl. No.: 08/996,861

[22] Filed: Dec. 23, 1997

[30] Foreign Application Priority Data

Dec. 24, 1996 [DE] Germany .......................... 196 54 376

[51] Int. Cl.$^6$ ...................................................... B60J 5/04
[52] U.S. Cl. ........................................ 296/188; 296/146.6
[58] Field of Search ................................... 296/188, 189, 296/146.6; 49/502; 52/735.1, 729.3

[56] References Cited

U.S. PATENT DOCUMENTS

| | | | |
|---|---|---|---|
| 5,080,427 | 1/1992 | Sturrus et al. ........................ | 296/146.6 |
| 5,600,931 | 2/1997 | Jonsson ................................ | 296/146.6 |
| 5,785,376 | 7/1998 | Nees et al. ............................. | 296/188 |

FOREIGN PATENT DOCUMENTS

| | | | |
|---|---|---|---|
| 2698322 | 5/1994 | France ................................. | 296/146.6 |
| 60725 | 5/1981 | Japan ................................... | 296/146.6 |

*Primary Examiner*—Dennis H. Pedder
*Attorney, Agent, or Firm*—McGlew and Tuttle, P.C.

[57] ABSTRACT

A side impact protection member for motor vehicle doors with a sheet metal strip of a profiled cross section, which has at least one longitudinally extending bead and has material strips joining the bead on both sides. The sheet metal strip has essentially flat ends for fastening to the motor vehicle door, and the height of the bead decreases continuously in the transition area toward the flat ends of the sheet metal strip. The sheet metal strip is formed of a cold-formable, high-strength steel material with a yield point of at least 980 N/mm$^2$ and a tensile strength of about 1,250 N/mm$^2$. The bottom of the bead has an essentially semicircular profile, and outer material strips of the sheet metal strip have edge recesses, which extend at least to the bead, directly adjoining the transition area.

16 Claims, 2 Drawing Sheets

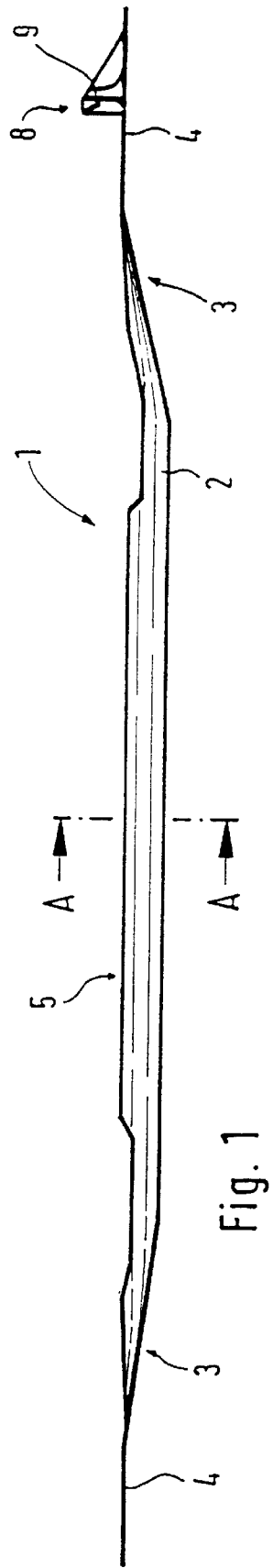
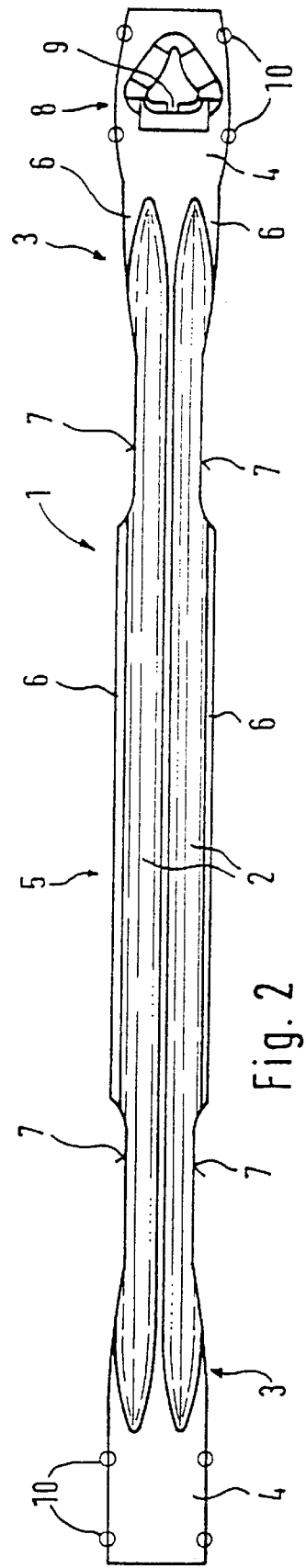

SIDE IMPACT PROTECTION MEMBER FOR MOTOR VEHICLE DOORS

FIELD OF THE INVENTION

The present invention pertains to a side impact protection member for motor vehicle doors comprising a sheet metal strip with profiled cross section, which has at least one longitudinally extending bead and material strips joining the bead on both sides, wherein the sheet metal strip has essentially flat ends for fastening to the motor vehicle door, and wherein the height of the bead continuously decreases in the transition area to the flat ends of the sheet metal strip.

BACKGROUND OF THE INVENTION

A prior-art side impact protection member of the type described in the introduction (WO 94/07709 A1) comprises a high-strength steel material with a bead, which has a trapezoidal profile. Such a profile is manufactured by expensive hot forming. The side impact protection member is fastened with its flat ends to associated components of the motor vehicle door, e.g., by weld connections or screw connections. At the required flexural strength, it has a broad and torsion-proof profile. The consequence of this is that, e.g., distortions occurring during pressing may lead to problems at the time of the installation in the door.

A side impact protection member comprising an extruded hollow section made of aluminum (DE Patent No. 37 09 489) has been known as well. In this design the hollow section has projecting material strips in the area of its corners, and the said material strips are provided with recesses in the area of the longitudinal center of the side impact protection member in order to prevent the hollow section from breaking and to guarantee a uniform deformation of the side impact protection member.

SUMMARY AND OBJECTS OF THE INVENTION

The object of the present invention is to propose a side impact protection member of the type described in the introduction, which is nevertheless torsionally so flexible despite the sufficient flexural strength that no problems arise during installation in the door and in which the expensive manufacture by hot forming can be abandoned.

According to the invention, a side impact protection member is provided for motor vehicle doors including a sheet metal strip of profiled cross section, which has at least one longitudinally extending bead and material strips joining the bead on both sides. The sheet metal strip has essentially flat ends for fastening to the motor vehicle door. The height of the bead continuously decreases in a transition area to the flat ends of the sheet metal strip. The sheet metal strip is formed of a cold-formable steel material with a yield point of at least 980 N/mm$^2$ and a tensile strength of about 1,250 N/mm$^2$. The bottom of the bead has an essentially semicircular profile and the outer material strips of the sheet metal strip have edge recesses extending at least to the bead, directly adjoining the transition area.

It has been found according to the present invention that a high-strength steel material possessing the properties indicated, which is also cold-formable, may be used to provide an essentially semicircular profile. This manner of manufacture is less expensive than the prior-art hot forming. Due to the edge recesses being arranged directly adjoining the transition area, the side impact protection member becomes torsionally more flexible while having a sufficient flexural strength over the largest possible longitudinal area at the same time. The connections of the side impact protection member to the associated components of the motor vehicle door will be preserved in the case of a collision even if the side impact protection member is loaded outside its longitudinal central plane. Even though the middle part of the side impact protection members may twist now, the twisting is absorbed by the areas in which the edge recesses are located. The connections to the motor vehicle door are correspondingly also stressed less.

The length of the edge recesses is preferably 10% to 20% of the profiled length (including the transition area) of the sheet metal strip. The depth of the bead may be comparatively great and preferably correspond to 20% to 50% of the width of the side impact protection member. In a preferred embodiment, the sheet metal strip has two mutually parallel beads.

In addition, it has proved to be advantageous to bend the outer material strips of the side impact protection member in the direction of the bottom of the bead such that this forms an angle of <90° with the web of the bead.

The connection means may comprise a connection lug bent up from the end of the sheet metal strip from the plane of the sheet metal. This connection lug forms an additional securing means in the form of a barb, which forms a connection to the fastening column of the door during a lateral impact. This is especially important if the welded connection by which the side impact protection member is connected to the door panels is, e.g., shorn off. The bent-up connection lug designed as a hook is integrated according to the present invention within the pressed part and is not screwed or welded on additionally as a separate part. This leads to additional cost savings.

The sheet metal strip according to the present invention has a relatively small elongation of at most 4% to 7%.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is the side view of a side impact protection member;

FIG. 2 is a top view of the object according to FIG. 1; and

DESCRIPTION OF THE PREFERRED EMBODIMENT

Figure 3:
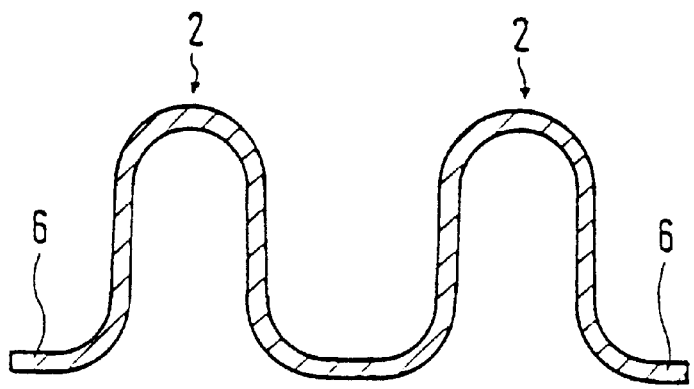
FIG. 3 is a sectional view in direction of line A—A through the object according to FIG. 1.

Referring to the drawings in particular, the invention comprises a side impact protection member shown in the drawings. The side impact protection member comprises an elongated sheet metal strip generally designated 1, in which two mutually parallel beads 2 are impressed in the course of the cold forming by deep drawing and/or bending. The depth of the beads 2 corresponds to about 20% to 50% of the width of the side impact protection member 100. The bottom of the bead has a semicircular profile (FIG. 3).

The beads 2 extend over the larger part of the length of the sheet metal strip 1 up to transition areas 3, in which the depth of the cross-sectional profile of each bead 2 continuously decreases in the direction of the flat ends 4 of the sheet metal strip 1 and passes over into the flat ends 4.

In the middle part 5 of the side impact protection member as well as in the transition areas 3, the beads 2 are joined by outer material strips 6. These material strips 6 have edge recesses 7, which extend up to the beads 2. The edge recesses 7 have a length is 10% to 20% of the profiled length (including the transition areas 3) of the sheet metal strip 1.

The ends 4 of the sheet metal strip 1 are usually connected to the door panels via weld points 10. A connection lug 8 with a hole or with a slot 9, which lug is bent up from the plane of the sheet metal, is provided, corresponding to FIGS. 1 and 2, at the right-hand end 4 of the sheet metal strip 1 as an additional securing means. With the door closed, this connection lug 8 extends into the area of the fastening column of the door and provides for additionally safety as a barb in the case of a lateral impact, should, e.g., the welded connection be shorn off.

The sheet metal strip 1 consists of a cold-formable, high-strength steel material. The cold formable, high-strength steel material permits a maximum elongation of at most 4% to 7%.

FIG. 3 shows the sectional view with the mutually parallel beads 2 and the two outer material strips 6.

Figure 4:
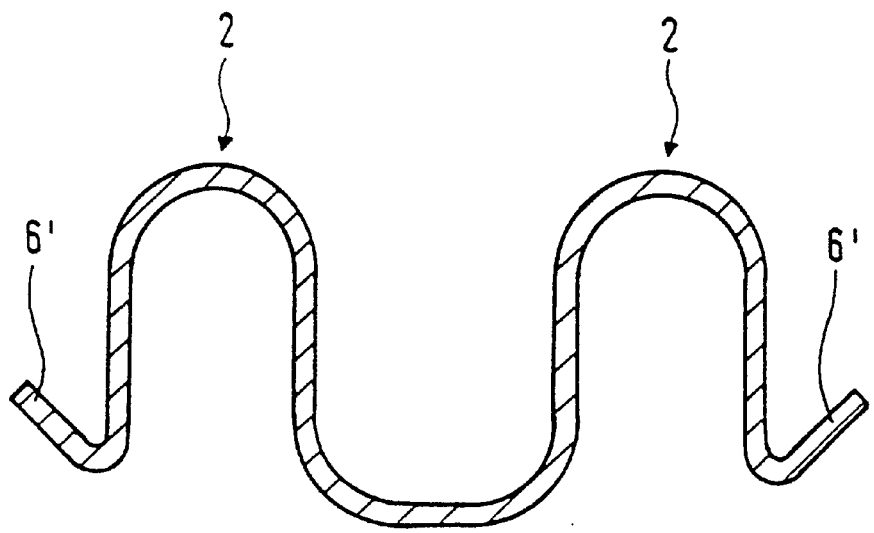
FIG. 4 is a sectional view in direction of line A—A through the object according to FIG. 1 wherein the outer material strips are bent over.

As is shown in FIG. 4, the outer material strips 6' may be bent over in the direction of the bottom of the bead such that these form an angle of <90° (less than 90 degrees) with the web of the bead 2.

While a specific embodiment of the invention has been shown and described in detail to illustrate the application of the principles of the invention, it will be understood that the invention may be embodied otherwise without departing from such principles.

What is claimed is:

1. A side impact protection member for motor vehicle doors, comprising:
    a sheet metal strip of profiled cross section, which has a bead structure including at least one longitudinally extending bead with a middle part and outer material strips joining said bead structure on both longitudinal side edges of said bead structure, said sheet metal strip having essentially flat ends for fastening to the motor vehicle door, and wherein a height of said at least one longitudinally extending bead continuously decreases in a transition area to said flat ends of the sheet metal strip, said sheet metal strip being cold-formed of a high-strength steel material with a yield point of at least 980 N/nm² and a tensile strength of about 1,250 N/mm², a bottom of said at least one longitudinally extending bead having an essentially semicircular profile, and beaded portions of said strip directly joining the transition areas having side edge recesses extending at least to said bead whereby the portions of said strip adjacent the ends are of a reduced width and increased torsional flexibility relative to said middle part.

2. The side impact protection member in accordance with claim 1, wherein a length of said edge recesses is 10% to 20% of a length of said profiled cross section including said transition areas.

3. The side impact protection member in accordance with claim 1, wherein a depth of said bead corresponds to 20% to 50% of a width of the side impact protection member.

4. The side impact protection member in accordance with claim 1, wherein said bead structure of said sheet metal strip has two mutually parallel beads.

5. The side impact protection member in accordance with claim 1, wherein said outer material strips are bent over from both said longitudinal side edges in a direction of said bead bottom so as to form an angle of <90° with bead material of said longitudinal side edges.

6. The side impact protection member in accordance with claim 1, wherein said sheet metal strip includes connection means comprising a connection lug forming a barb bent up from material forming said at least one of said ends of said sheet metal strip leaving a residual aperture therein.

7. The side impact protection member in accordance with claim 1, wherein said steel material has an elongation of at most 4% to 7%.

8. The side impact protection member in accordance with claim 1, wherein said at least one bead has a reduced lateral dimension near said recess and adjacent the transition areas.

9. A side impact protection memberfor motor vehicle doors, comprising:
    a sheet metal strip of profiled cross section, which has a bead structure including at least one longitudinally extending bead with a longitudinally medial region and outer material strips joining both longitudinal side edges of said bead structure only in the medial region, said sheet metal strip having essentially flat ends for fastening to the motor vehicle door, which flat ends are longitudinally spaced apart from said outer material strips so that portions of reduced width and increased torsional flexibility relative to the medial region are defined between respective flat ends and the medial region, and wherein a height of said at least one longitudinally extending bead continuously decreases in a transition area to said flat ends of the sheet metal strip, said sheet metal strip being cold-formed from, a single piece of high-strength steel material with a yield point of at least 980 N/mm² and a tensile strength of about 1,250 N/mm², and said at least one longitudinally extending bead has a major portion of essentially semicircular profile.

10. The side impact protection member in accordance with claim 9, wherein a length of said material strips is 80% to 90% of a length of said profiled cross section including said transition areas.

11. The side impact protection member in accordance with claim 10, wherein said at least one longitudinally extending bead has a uniform cross sectional size throughout the medial region.

12. The side impact protection member in accordance with claim 10, wherein a depth of said bead medial region corresponds to 20% to 50% of a width of the side impact protection member adjacent to said medial region.

13. The side impact protection member in accordance with claim 10, wherein said bead structure of said sheet metal strip has two mutually parallel beads.

14. The side impact protection member in accordance with claim 10, wherein said outer material strips are bent over from both said longitudinal side edges so as to form an angle of <90° with bead material of said longitudinal side edges.

15. The side impact protection member in accordance with claim 10, wherein said sheet metal strip includes connection means comprising a connection lug forming a barb bent up from material forming said at least one of said ends of said sheet metal strip leaving a residual aperture therein.

16. A side impact protection member for motor vehicle doors, comprising:
    a sheet metal strip of profiled cross section, which has a bead structure including at least one longitudinally extending bead with a middle portion and outer material, strips joining said bead structure on both longitudinal side edges of said bead structure, said sheet metal strip has essentially flat ends for fastening to the motor vehicle door, and wherein a height of said at least one longitudinally extending bead continuously decreases in a transition area to said flat ends of the sheet metal strip, said sheet metal strip being formed of a cold-formable, high-strength steel material with a yield point of at least 980 N/mm$^2$ and a tensile strength of about 1,250 N/mm$^2$, a bottom of said at least one longitudinally extending bead has an essentially semi-circular profile, and portions of said strip adjacent the transition areas have side edge recesses extending at least to said bead whereby the strip portions are of reduced width and increased torsional flexibility relative to said middle portion, and, wherein said outer material strips are bent over from both said longitudinal side edges in a direction of said bead bottom so as to form an angle of <90° with bead material of said longitudinal side edges.

* * * * *